United States Patent [19]

Cymbal

[11] Patent Number: 5,803,496
[45] Date of Patent: Sep. 8, 1998

[54] ENERGY-ABSORBING STEERING COLUMN FOR MOTOR VEHICLE

[75] Inventor: William David Cymbal, Freeland, Mich.

[73] Assignee: General Motors Corporation, Detroit, Mich.

[21] Appl. No.: 829,032

[22] Filed: Mar. 31, 1997

[51] Int. Cl.⁶ ...................................................... B62D 1/19
[52] U.S. Cl. ............................ 280/777; 74/492; 188/374
[58] Field of Search .............................. 280/777; 74/492; 188/371, 374

[56] References Cited

U.S. PATENT DOCUMENTS

| | | | |
|---|---|---|---|
| 3,792,626 | 2/1974 | Durkee et al. | 74/492 |
| 3,827,710 | 8/1974 | Connell et al. | 280/777 |
| 5,517,877 | 5/1996 | Hancock | 74/492 |
| 5,570,610 | 11/1996 | Cymbal | 74/493 |
| 5,605,352 | 2/1997 | Riefe et al. | 280/777 |
| 5,692,778 | 12/1997 | Cymbal | 280/777 |

*Primary Examiner*—Peter C. English
*Attorney, Agent, or Firm*—Saul Schwartz

[57] ABSTRACT

An energy-absorbing steering column for a motor vehicle including a housing, an energy absorber between the housing and a body structure of the motor vehicle, a box-shaped bracket on the body structure surrounding a first end of the housing for vertical support, and a horizontal rod on the housing near a second end thereof, the lateral ends of which are seated on horizontal shoulders of a pair of vertical hangers on the body structure for vertical support of the second end of the housing. A cam is rotatably supported on the horizontal rod and locked in a retracted position by a retainer until the housing achieves vertical support on the body structure by the box-shaped bracket and the horizontal shoulders of the vertical hangers. When the retainer is withdrawn from the cam, a torsion spring rotates the cam to a position wedged between the body structure and the housing to eliminate vertical lash.

6 Claims, 2 Drawing Sheets

ENERGY-ABSORBING STEERING COLUMN FOR MOTOR VEHICLE

TECHNICAL FIELD

This invention relates to an energy-absorbing steering column for a motor vehicle.

BACKGROUND OF THE INVENTION

An energy-absorbing steering column described in U.S. patent application Ser. No. 08/544,237, filed Oct. 17, 1995 and assigned to the assignee of this invention, includes a magnesium die cast housing, a steering shaft and a steering wheel supported on the housing for unitary rotation, and an energy absorber between the housing and a body structure of the motor vehicle responsive to relative linear translation of the housing induced by an impact on the steering wheel to convert into work a fraction of the kinetic energy of such impact. Vertical support of the housing on the body structure is provided by a box-shaped bracket on the body structure surrounding a first end of the housing and a horizontal rod on the housing near a second end thereof, the lateral ends of which are seated on horizontal shoulders of a pair of vertical hangers on the body structure. The energy absorber is wedged between the housing and the box-shaped bracket to eliminate lash in the direction of linear translation of the housing. Vertical lash is eliminated by a spring between the body structure and the housing. An energy-absorbing steering column described in U.S. patent application Ser. No. 08/747,807, filed Nov. 14, 1996 and assigned to the assignee of this invention, is substantially like the one described in the aforesaid U.S. patent application Ser. No. 08/544,237 except that (a) the horizontal rod is mounted on the body structure instead of on the steering column housing and cooperates with a bracket on the steering column housing above the horizontal rod in vertically supporting the corresponding end of the housing on the body structure, and (b) vertical lash is eliminated by oblique ramps on the steering column housing which are spring biased against the horizontal rod on the body structure from below the horizontal rod.

SUMMARY OF THE INVENTION

This invention is a new and improved energy-absorbing steering column for a motor vehicle including a magnesium die cast housing, an energy absorber between the housing and a body structure of the motor vehicle responsive to relative linear translation of the housing induced by an impact on a steering wheel of the steering column to convert into work a fraction of the kinetic energy of such impact, a box-shaped bracket on the body structure surrounding a first end of the housing for vertical support and linear guidance of the housing, and a horizontal rod on the housing near a second end thereof, the lateral ends of which are seated on horizontal shoulders of a pair of vertical hangers on the body structure. The energy absorber is wedged between the body structure and the steering column housing to eliminate lash in the direction of linear translation of the housing. A cam is rotatably supported on the horizontal rod and locked in a retracted position by a retainer until the housing achieves vertical support on the body structure by the box-shaped bracket and by the horizontal shoulders of the vertical hangers. When the retainer is withdrawn from the cam, a torsion spring rotates the cam to a position wedged between the body structure and the steering column housing to eliminate vertical lash.

DESCRIPTION OF THE PREFERRED EMBODIMENT

Figure 1:
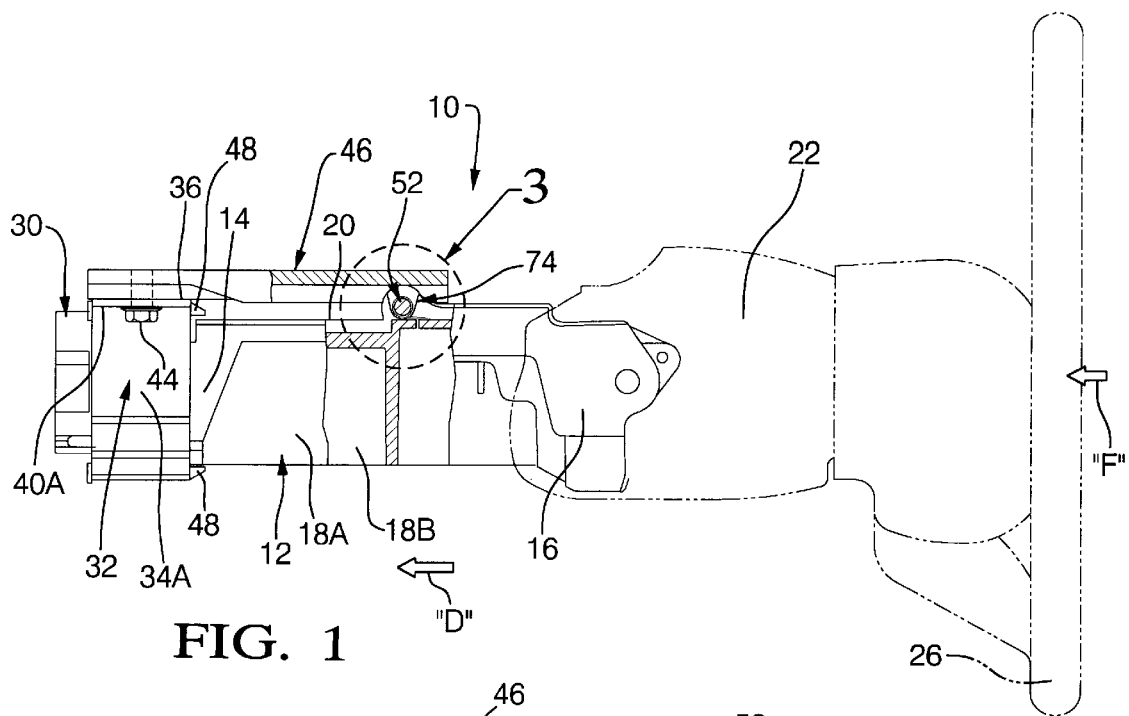
FIG. 1 is a fragmentary, partially broken-away elevational view of a motor vehicle steering column according to this invention.

An energy-absorbing motor vehicle steering column 10 according to this invention includes a magnesium die case housing 12 having a first end 14, a second end 16, a pair of vertical walls 18A, 18B, and a horizontal wall 20. A tilt housing, not shown, of the steering column 10 concealed behind a shroud 22 is supported on a pair of lugs 24A, 24B at the second end 16 of the housing 12 for up and down pivotal movement. A steering wheel 26 is rotatably supported on the tilt housing and connected for unitary rotation to a steering shaft, not shown, supported on the housing 12 for rotation about a longitudinal centerline 28 thereof.

A plastic carrier 30 for an anti-friction bearing, not shown, between the housing 12 and the aforesaid steering shaft is attached to the housing at the first end 14 thereof. The plastic carrier is closely received in a box-shaped bracket 32 having a pair of vertical sides 34A, 34B, an upper horizontal side 36, a lower horizontal side 38, and a pair of lateral flanges 40A, 40B in the plane of the upper horizontal side. Each lateral flange 40A, 40B has a perforation 42 therein to receive a corresponding one of a pair of fasteners 44 which function to rigidly clamp the box-shaped bracket 32 to a structural element 46 of a body structure of the motor vehicle whereby the first end 14 of the housing 12 is supported vertically on the structural element 46. A pair of hooks 48 on the plastic carrier 30 seat behind corresponding ones of a pair of edges 50A, 50B of the upper and lower horizontal sides 36, 38 of the box-shaped bracket for nominal retention of the carrier in the bracket.

A horizontal rod 52 rigidly supported on the housing 12 of the steering column near the second end 16 thereof has a pair of lateral ends 54A, 54B outboard of the vertical sides 18A, 18B of the housing. The lateral ends 54A, 54B seat on corresponding ones of a pair of horizontal annular shoulders 56A, 56B on a pair of vertical hangers 58A, 58B rigidly attached to the structural element 46 on opposite sides of the housing 12 whereby the second end 16 of the housing is vertically supported on the structural element 46.

Figure 2:
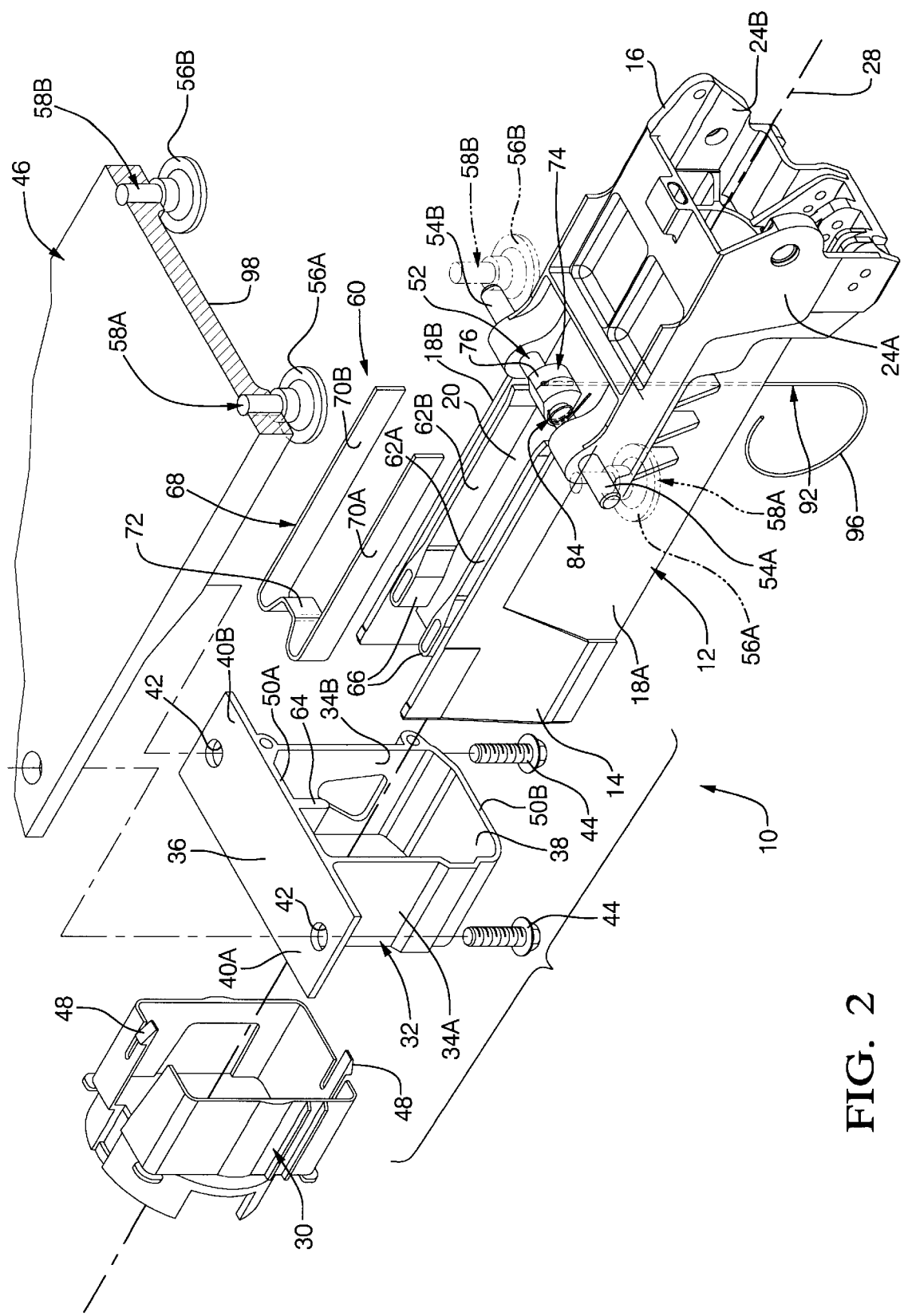
FIG. 2 is an exploded perspective view of the motor vehicle steering column according to this invention.

An energy absorber 60 of the steering column, FIG. 2, includes a pair of integral partition walls 62A, 62B on housing 12 perpendicular to the horizontal wall 20 and an abutment 64 on the upper horizontal side 36 of the box-shaped bracket 32 parallel to and between the partition walls. Each partition wall 62A, 62B terminates at an integral boss 66 which defines a convex anvil on the end of the corresponding one of the partition walls. A flat metal ribbon 68 is shaped to include a pair of straight sections 70A, 70B and a lateral web 72. The ribbon is seated edge-wise on the horizontal wall 20 of the housing 12 with the straight sections 70A, 70B between the partition walls 62A, 62B and the vertical walls 18A, 18B, respectively, and with the lateral web 72 looped over and extending laterally between the bosses 66 at the ends of the partition walls.

The lateral web 72 defines a beam between the bosses 66 on the housing 12 which is flexed within its elastic limit by the abutment 64 on the box-shaped bracket 32 to induce relative separation between the box-shaped bracket and the housing 12 in the direction of the longitudinal centerline 28. The vertical hangers 58A, 58B cooperate with the lateral ends 54A, 54B of the horizontal rod 52 in limiting such relative separation so that the lateral web 72 is tightly captured or wedged between the anvils defined by the bosses 66 and the abutment 64 whereby lash in the direction of the longitudinal centerline 28 between the housing 12 and the structural element 46 is eliminated.

Figure 3:
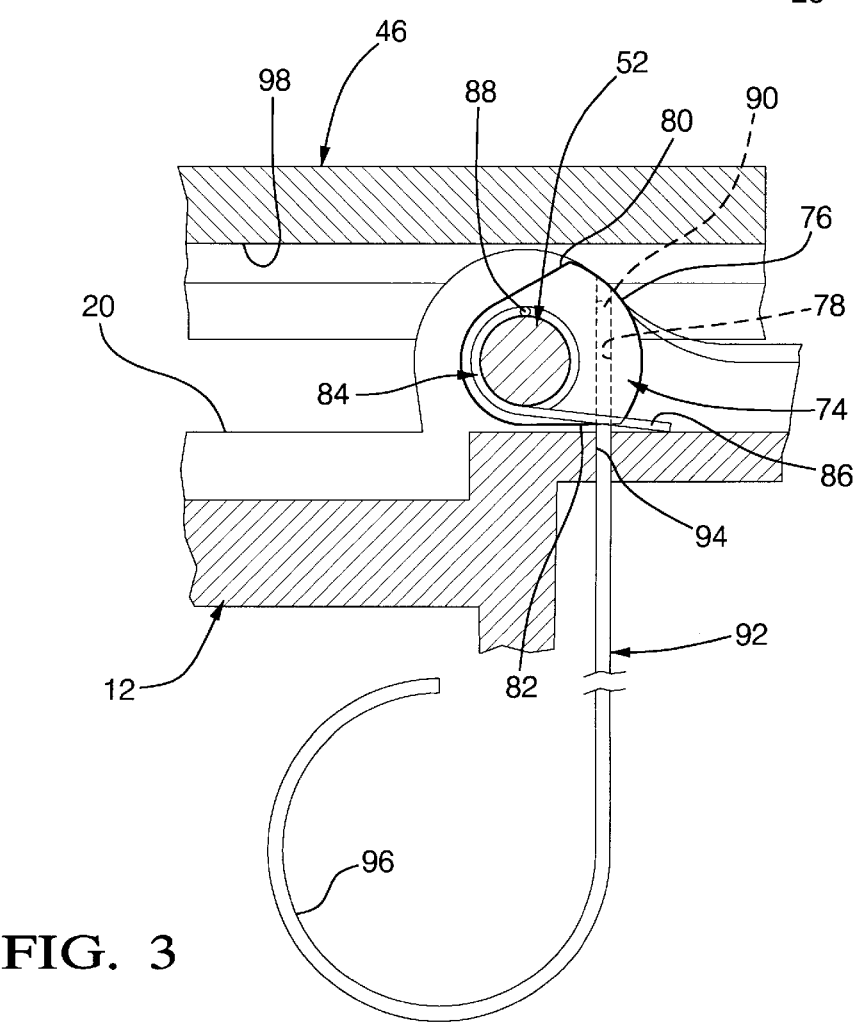
FIG. 3 is an enlarged view of the portion of FIG. 1 identified by reference circle 3 in FIG. 1.

As seen best in FIGS. 2–3, a cam 74 is rotatably supported on the horizontal rod 52 in the middle of the housing 12 of the steering column and includes a peripheral shoulder 76 and a linear bore 78. The peripheral shoulder flares outward relative to the axis of rotation of the cam from a leading edge 80 of the shoulder to a trailing edge 82. A torsion spring 84 coiled around the horizontal rod 52 adjacent to the cam 74 has a first arm 86 bearing against the horizontal wall 20 of the housing 12 and a second arm 88 hooked to the cam. The torsion spring 84 urges counterclockwise rotation, FIG. 3, of the cam 74 about the horizontal rod 52.

A distal end 90 of a wire-like retainer 92 protrudes through a passage 94 in the horizontal wall 20 of the housing 12 of the steering column into the linear bore 78 in the cam 74. A loop 96 at the other end of the retainer is accessible from outside of the housing 12. The retainer 92 locks the cam 74 in a retracted position thereof, FIGS. 2–3, against the bias of the torsion spring 84 until the distal end 90 of the retainer is withdrawn from the linear bore 78 in the cam.

Before the housing 12 of the steering column 10 is mounted on the structural element 46, the cam 74 is locked in its retracted position by the retainer 92. The second end 16 of the housing 12 is tilted toward the vertical hangers 58A, 58B and the lateral ends 54A, 54B of the horizontal rod 52 are seated on the horizontal shoulders 56A, 56B of the vertical hangers for vertical support of the second end 16 on the body structure. The housing 12 is then pivoted about a centerline defined by the horizontal shoulders 56A, 56B until the upper horizontal side 36 of the box-shaped bracket 32 seats against the structural element 46. The fasteners 44 are then installed through the perforations 42 in the lateral flanges 40A, 40B to rigidly clamp the box-shaped bracket to the structural element 46 for vertical support of the first end 14 of the housing 12 on the body structure. Concurrently, the lateral web 72 of the flat ribbon 68 is wedged between the housing 12 and the structural element 46 as described above to eliminate lash therebetween in the direction of the longitudinal centerline 28.

After the fasteners 44 are installed, an operator manually grasps the loop 96 on the retainer 92 and withdraws the distal end 90 of the retainer from the linear bore 78 in the cam. The torsion spring 84 rotates the cam counterclockwise, FIG. 3, from its retracted position toward a position, FIG. 1, characterized by tangential engagement of the peripheral shoulder 76 of the cam against a reaction surface 98 of the structural element 46 facing the horizontal wall 20 of the housing 12. Because of the aforesaid outward flare of the peripheral shoulder 76 of the cam, the torque applied by the torsion spring 84 to the cam 74 is converted to vertical thrust, urging relative separation between the housing 12 and the structural element 46 until the cam is tightly wedged between the horizontal rod 52 and the reaction surface 98 of the structural element with the lateral ends 54A, 54B of the horizontal rod 52 seated on the horizontal shoulders 56A, 56B of the vertical hangers 58A, 58B. The cam 74, wedged between the horizontal rod 52 and the reaction surface 98, eliminates vertical lash between the housing 12 and the structural element 46.

Energy-absorbing linear translation of the housing 12 of the steering column 10 in a collapse direction "D", FIG. 1, is initiated by an impact on the steering wheel 26 represented by a resultant vector force "F". That impact concurrently dislodges the hooks 48 from the edges 50A, 50B of the box-shaped bracket 32 and the lateral ends 54A, 54B of the horizontal rod 52 from the horizontal shoulders 56A, 56B of the vertical hangers 58A, 58B after which the housing translates linearly in the collapse direction "D" under the guidance of the box-shaped bracket 32. Because the direction of relative movement between the housing 12 and the structural element 46 is opposite to the direction corresponding to wedging of the peripheral shoulder 76 of the cam 74 against the surface 98 of the structural element, the cam does not impede linear translation of the housing in the collapse direction.

The bosses 66 on the housing 12 induce linear translation of the flat ribbon 68 as a unit with the housing 12 in the collapse direction "D". The abutment 64 on the box-shaped bracket 32 anchors the center of the lateral web 72 of the flat ribbon on the structural element 46 so that concurrent with advancement of the bosses 66 relative to the abutment 64, the straight sections 70A, 70B of the flat ribbon are bent substantially 180° around and are pulled across the anvils defined by the bosses. Plastic deformation of the straight sections 70A, 70B which occurs as they bend over the anvils converts into work a fraction of the kinetic energy of the impact represented by the vector force "F". In addition, friction which develops between the straight sections and the bosses 66 converts into work an additional fraction of the kinetic energy of the impact represented by the vector force "F".

I claim:

1. An energy-absorbing steering column for a motor vehicle comprising:

a housing having a first end and a second end, a first support means operative to support vertically said first end of said housing on a body structure of said motor vehicle and to guide said housing for linear translation in a collapse direction in response to an impact on a steering wheel of said steering column in said collapse direction, a second support means operative to support vertically said second end of said housing on said body structure and to release said housing from said body structure for linear translation in said collapse direction in response to said impact on said steering wheel in said collapse direction, an energy absorber means between said housing and said body structure operative in response to linear translation of said housing in said collapse direction induced by said impact on said steering wheel to convert into work a fraction of the kinetic energy of said impact, a cam rotatably supported on said housing near said second end thereof having a peripheral shoulder flaring outward relative to an axis of rotation of said cam, and a spring rotatably biasing said cam to a position in which said peripheral shoulder on said cam bears against a reaction surface on said body structure to wedge said cam between said body structure and said housing to eliminate vertical lash between said body structure and said housing.

2. The energy-absorbing steering column recited in claim 1 further comprising:

a retainer means on said housing and on said cam operative to lock said cam in a retracted position thereof corresponding to said peripheral shoulder on said cam being remote from said reaction surface on said body structure and to release said cam for rotation to said position wedged between said housing and said reaction surface after said housing is vertically supported on said body structure by said first and said second support means.

3. The energy-absorbing steering column recited in claim 2 wherein said retainer means comprises:

a linear bore in said cam, and a wire-like retainer in a passage in said housing having a distal end in said linear bore in said cam to lock said cam in said retracted position thereof and removable from said linear bore to release said cam for rotation to said position thereof wedged between said body structure and said housing.

4. The energy-absorbing steering column recited in claim 3 wherein said second support means operative to support vertically said second end of said housing on said body structure and to release said housing from said body structure for linear translation in said collapse direction in response to said impact on said steering wheel in said collapse direction comprises:

a pair of vertical hangers on said body structure on opposite sides of said housing each having a horizontal shoulder thereon, and a horizontal rod on said housing having a pair of lateral ends outboard of said housing each seated on said horizontal shoulder of a corresponding one of said pair of vertical hangers.

5. The energy-absorbing steering column recited in claim 4 wherein said first support means operative to support vertically said first end of said housing on said body structure and to guide said housing for linear translation in a collapse direction in response to an impact on said steering wheel in said collapse direction comprises:

a box-shaped bracket rigidly attached to said body structure having a pair of vertical sides on opposite sides of said housing at said first end thereof and a lower horizontal side below said housing at said first end thereof and an upper horizontal side above said housing at said first end thereof.

6. The energy-absorbing steering column recited in claim 5 wherein said energy absorber means between said housing and said body structure operative in response to linear translation of said housing in said collapse direction induced by said impact on said steering wheel to convert into work a fraction of the kinetic energy of said impact comprises:

an abutment on said box-shaped bracket, a pair of anvils on said housing on opposite sides of said abutment, and a flat metal ribbon seated on a horizontal wall of said housing having a lateral web wedged between said abutment and said pair of anvils and a pair of straight sections on opposite sides of respective ones of said pair of anvils from said lateral web, said abutment anchoring said lateral web on said box-shaped bracket so that during linear translation of said housing in said collapse direction each of said pair of straight sections of said flat ribbon is pulled across and plastically deformed around a corresponding one of said pair of anvils on said housing.

* * * * *